May 1, 1934.  B. L. WILCOX  1,957,239
MITER BOX
Filed March 8, 1933
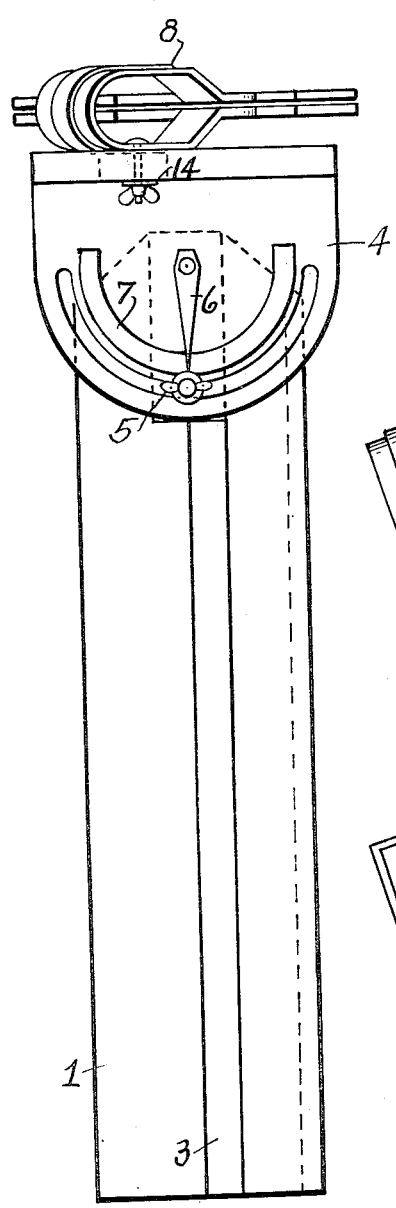
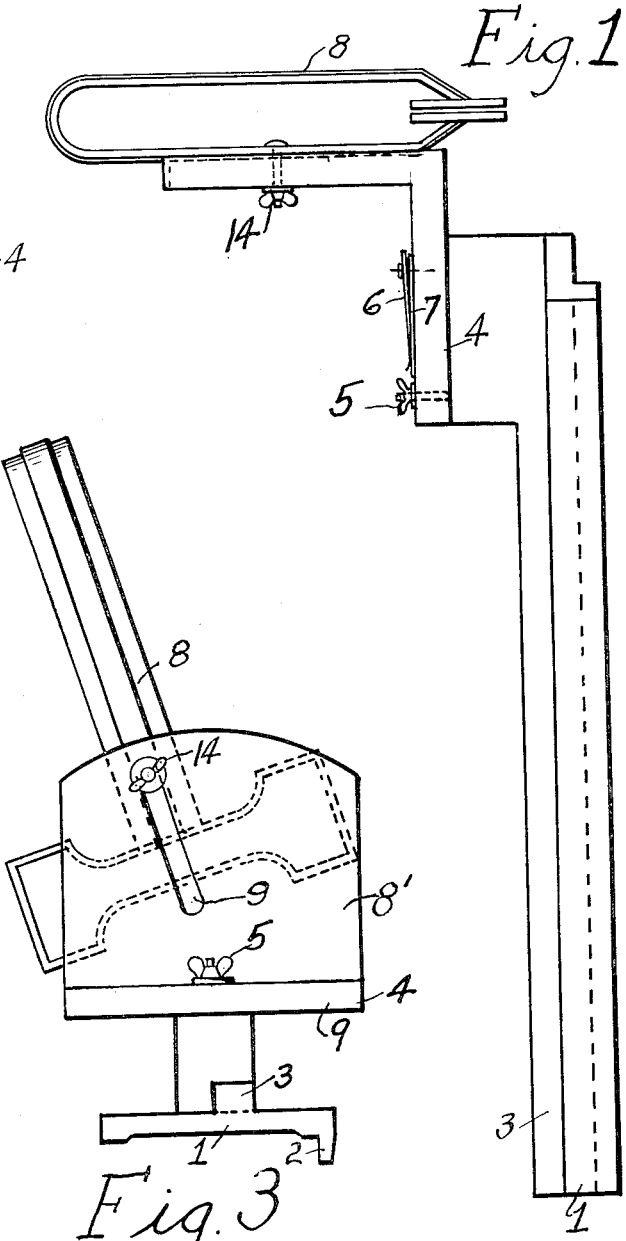
INVENTOR.
Basil L Wilcox

UNITED STATES PATENT OFFICE 1,957,239

MITER BOX

Basil L. Wilcox, Wellsboro, Pa.

Application March 8, 1933, Serial No. 660,041

1 Claim. (Cl. 143—89)

The invention relates to improvement in the method of sawing wooden boards or moulding squarely or at any angle whereby any size material may be cut squarely or at any angle, and the cutting tool or saw operated in any position; and the objects of the improvement are:—

First; to provide a tool whereby wooden boards or moulding may be cut squarely or at any angle from the natural sawing position;

Second; to provide a tool of a portable nature which can be moved to and placed upon boards of any size, thickness or width;

Third; to provide a tool whereby wooden boards or moulding may be cut squarely or at any angle by the use of any common saw.

One form of the invention is illustrated in the accompanying drawing, in which Figure 1 is a plan view of the tool as it appears without the saw; and Figure 2, a front view of the tool as it appears without the saw; and Figure 3, an end view of the machine as it appears without the saw.

The tool and its functions are shown in the accompanying drawing as follows:—

The base of the tool, made of cast iron or other suitable material, numeral 1, has a protruding square edge as shown by numeral 2. The tool rests squarely against the edge and upon the top surface of the material to be trued and cut. Upon the upper surface is a square edge numeral 3, against which smaller material such as moulding may be squared and cut. Numeral 4 indicates the adjustable turn table by which the cutting angle of the saw is regulated. The adjustment is made by the thumb screw, numeral 5, which holds the table at the desired sawing angle. Numeral 6 is a fixed pointer which indicates on the protractor, numeral 7, the degrees to which the table is turned. Attached to the vertical portion 8' of the adjustable table is the saw guide, numeral 8, made of spring steel which permits the operation of the saw at whatever angle desired by the operator. Numeral 9, indicates a slot in the holder with an adjustable screw 14 for raising the saw holder so that for unusually wide material the sawing position may be maintained.

I claim:

In a miter box, a work supporting base, a depending square-edge along one margin of said base for positioning said base upon relatively wide work, an upstanding square-edge extending longitudinally of said base for optionally positioning relatively narrow work on said base, a bracket adjustably pivoted on said second square-edge about an axis substantially perpendicular to said base and adjacent one end of said second square-edge, and a saw guide carried by and movable with said bracket.

BASIL L. WILCOX.